(12) United States Patent
Wilson et al.

(10) Patent No.: US 9,303,693 B2
(45) Date of Patent: Apr. 5, 2016

(54) BUSH ASSEMBLY (71) Applicant: AIRBUS OPERATIONS LIMITED, Bristol (GB)

(72) Inventors: James Wilson, Winscombe (GB); Alan Quayle, Bristol (GB); Paul Hadley, North Somerset (GB); John Colin West, Pontypridd (GB); Simon Carrick, Bristol (GB); John Monteith, Bristol (GB); Peter Mason, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 14/397,699

(22) PCT Filed: Apr. 25, 2013

(86) PCT No.: PCT/GB2013/051052
§ 371 (c)(1),
(2) Date: Oct. 29, 2014

(87) PCT Pub. No.: WO2013/164580
PCT Pub. Date: Nov. 7, 2013

(65) Prior Publication Data
US 2015/0086143 A1  Mar. 26, 2015

(30) Foreign Application Priority Data
Apr. 30, 2012 (GB) .................................. 1207511.5

(51) Int. Cl.
*F16C 33/74* (2006.01)
*F16C 17/02* (2006.01)
(Continued)

(52) U.S. Cl.
CPC ............... *F16C 33/74* (2013.01); *F16B 43/001* (2013.01); *F16C 17/02* (2013.01); *B23Q 1/25* (2013.01); *F16C 2326/01* (2013.01)

(58) Field of Classification Search
CPC ..................... Y10T 29/53657; B25B 27/0028; B23P 19/084; F16C 2322/50; F16C 2237/00
USPC ................. 384/130, 215, 275–276, 416, 607; 269/87.1, 97, 138; 277/316; 29/235, 29/263, 270, 402.2, 888.02
See application file for complete search history.

(56) References Cited

U.S. PATENT DOCUMENTS 2,957,717 A * 10/1960 Bram ............................. 277/618
4,310,933 A *  1/1982 Stratman .................. 241/46.015
(Continued)

FOREIGN PATENT DOCUMENTS

EP          0486869 A1   5/1992
GB          310685 A     5/1929
(Continued)

OTHER PUBLICATIONS

International Search Report mailed Jul. 30, 2013 in International Application No. PCT/GB2013/051052, filed Apr. 25, 2013.
(Continued)

*Primary Examiner* — Marcus Charles
(74) *Attorney, Agent, or Firm* — Hauptman Ham, LLP (57) ABSTRACT

A bush assembly comprising a component having a bore, a bush fitted in the bore and having a flange that extends radially outwardly over a surface of the component surrounding the bore, and a seal assembly for sealing the interface between the flange and the surface of the component, wherein the seal assembly includes a seal member and a layer of sealant between the seal member and the interface between the flange and the surface of the component. Also a method for sealing a bush, a kit of parts for forming a bush assembly, and a clamping tool for forming a bush assembly.

15 Claims, 8 Drawing Sheets

(51) Int. Cl.
*B23Q 1/25* (2006.01)
*F16B 43/00* (2006.01)

(56) References Cited

U.S. PATENT DOCUMENTS

| | | | |
|---|---|---|---|
| 4,372,015 A * | 2/1983 | Rhoton | 269/47 |
| 4,655,643 A * | 4/1987 | Lane et al. | 405/259.5 |
| 5,037,254 A * | 8/1991 | Asberg | 409/233 |
| 5,193,960 A | 3/1993 | Fukushima et al. | |
| 5,418,983 A * | 5/1995 | Garguillo et al. | 4/287 |
| 5,709,018 A * | 1/1998 | Dugan | 29/235 |
| 5,745,931 A * | 5/1998 | Ball | 4/286 |
| 5,887,913 A * | 3/1999 | Kojima et al. | 285/368 |
| 5,893,202 A * | 4/1999 | Graham et al. | 29/402.02 |
| 6,065,198 A * | 5/2000 | Vitous et al. | 29/258 |
| 6,979,027 B2 * | 12/2005 | Hetzler et al. | 285/337 |
| 7,389,579 B2 * | 6/2008 | Rode | 384/540 |

FOREIGN PATENT DOCUMENTS

| | | |
|---|---|---|
| GB | 513976 A | 10/1939 |
| GB | 1527213 A | 10/1978 |
| GB | 2359604 A | 8/2001 |

OTHER PUBLICATIONS

Written Opinion mailed Jul. 30, 2013 in International Application No. PCT/GB2013/051052, filed Apr. 25, 2013.
UKIPO Search Report dated Aug. 16, 2012 in GB Application No. 1207511.5.
Chinese Office Action dated Jul. 28, 2015 in China Application No. 201380035130.2, filed Apr. 25, 2013.

* cited by examiner

BUSH ASSEMBLY

RELATED APPLICATIONS

The present application is a National Phase of International Application Number PCT/GB2013/051052, filed Apr. 25, 2013, and claims priority from Great Britain Application Number 1207511.5, filed Apr. 30, 2012.

FIELD OF THE INVENTION

The invention relates to a bush assembly; to a kit of parts for forming a bush assembly; to a method for sealing a bush; and to a clamping tool for forming a bush assembly.

BACKGROUND OF THE INVENTION

A bush may be fitted in a bore in a component to provide an inner surface within the bore. The inner surface may, for example, provide a bearing surface for receiving a rod or shaft which passes through or into the component. The bush may have a flange which locates the bush within the bore and covers the interface between the bush and the bore surface.

Over time, the performance of the bush may be reduced, for example due to degradation of the bush and/or the bore surface. Degradation of the interface between the bush and the bore may occur due to contamination, for example by water, oil, dirt or debris, resulting in surface corrosion of the bush and/or bore. The flange may act to reduce contamination of the interface between the bush and the bore, and a layer of sealant may be applied over the bush flange and the surface of the component to seal the bush. However, contamination/corrosion of the bush may still occur, particularly if the layer of sealant becomes damaged or degraded, for example due to mechanical wear, corrosion or age hardening.

In some cases, it may become necessary to replace the bush, or to re-bore the component and fit a new bush having a larger outside diameter to fit the new bore, or even to replace the component entirely if extensive corrosion has occurred. The problem of contamination of bushes may present a particular problem for large bush assemblies, in which the parts may be difficult and expensive to maintain, monitor and replace. If the component is an aircraft component, for example a main landing gear component, these maintenance tasks may require the aircraft to be removed from service while the maintenance tasks are carried out. Replacing a main landing gear component due to a degraded bush assembly may be time consuming, expensive and wasteful of materials.

SUMMARY OF THE INVENTION

The invention relates to a seal for sealing a bush assembly. The seal includes a seal member which sits over a flange of the bush which is fitted in a bore of a component and a material for sealing between the seal member and the flange/component.

A first aspect of the invention provides a bush assembly comprising a component having a bore, a bush fitted in the bore and having a flange that extends radially outwardly over a surface of the component surrounding the bore, and a seal assembly for sealing the interface between the flange and the surface of the component, wherein the seal assembly includes a seal member and a layer of sealant between the seal member and the interface between the flange and the surface of the component.

A second aspect of the invention provides a kit of parts for forming a bush assembly, the kit of parts comprising a bush for fitting in a bore in a component, a seal member and a sealant material; wherein the bush has a flange that is adapted to extend radially outwardly over a surface of the component surrounding the bore when the bush is fitted in the bore; and wherein the sealant material is for providing a layer of sealant between the seal member and an interface between the flange and the surface of the component such that the layer of sealant and the seal member form a seal assembly for sealing the interface between the flange and the surface of the component.

A third aspect of the invention provides a method for sealing a bush, the method comprising the steps of: providing a component having a bore with a bush fitted in the bore, the bush having a flange that extends radially outwardly over a surface of the component surrounding the bore; arranging a seal member with respect to the bush; and introducing a sealant material so as to provide a layer of the sealant material between the seal member and an interface between the flange and the surface of the component to form a seal assembly for sealing the interface between the flange and the surface of the component.

A fourth aspect of the invention provides a clamping tool for applying a clamping force for sealing a bush installed in a bore in a component, the tool comprising a first part, a second part and a clamping mechanism; wherein the first part comprises a recess which is adapted to engage a seal; the second part is adapted to engage a surface of the component which opposes and faces away from a surface of the component on which the seal is provided; the clamping mechanism is operable to move the first part relative to the second part, thereby applying a clamping force to the seal; and wherein the clamping tool includes centring means for centring the clamping tool relative to the bush.

The seal assembly may be adapted to substantially prevent the ingress of contaminants into the interface between the flange and the surface of the component, for example to prevent the ingress of water or oil or dirt or debris. The seal assembly may, therefore, reduce or eliminate the ingress of water and/or any other contaminants into the interface between the bush and the surface of the bore.

By reducing or preventing the ingress of contaminants between the bush and the component, the seal assembly may reduce the rate of degradation of the bush and/or the component, thereby reducing the need for maintenance activities, for example re-boring of the bore and replacement of the bush or replacement of the component.

The layer of sealant has both adhesive and sealing properties. The layer of sealant may comprise a conventional sealant or aerospace sealant, for example an epoxy sealant or two part epoxy sealant such as aerospace sealant PR-2001 under ABP 4-5142. The aerospace sealant may be used in conjunction with an adhesion promoter. Alternatively (or in addition) the layer of sealant may comprise a conventional adhesive or aerospace adhesive, for example an epoxy adhesive e.g. under AIMS 10-04-002 or a two-part epoxy adhesive.

The seal member may comprise a solid component which is not an adhesive or sealant type material.

The seal member may be adapted to substantially cover the layer of sealant, for example the seal member may cover more than 70% of the layer of sealant when viewed in plan view along the axis of the bore. Preferably the seal member covers more than 80% or more than 90% or more than 95% or more than 99% of the area of the layer of sealant.

The seal member may, therefore, protect the layer of sealant from degradation, for example due to moisture, chemicals and mechanical wear. The seal member may also help to prevent the ingress of contaminants through the layer of sealant, particularly if the seal member is less permeable to contaminants than the layer of sealant or if the properties of the layer of sealant become degraded over time.

The seal member may be tougher and less permeable than the layer of sealant so that the combined effect of the seal member and the layer of sealant provides a more effective barrier against contamination than a layer of sealant alone.

The seal member may be substantially annular.

The annular seal member may be substantially concentric with the bore.

The annular seal member may be continuous. Alternatively the annular seal member may comprise a split. The split may extend between an inner radial edge and an outer radial edge of the seal member. The split may allow the seal member to be deformed to generate an opening along a split line. Therefore if a pin is located within a bush fitted in a bore of a component, the seal member may be fitted to the bush assembly without removing the pin, for example by opening the split, passing the pin through the slit, and then closing the split so that the seal member radially surrounds the pin. The split may therefore increase ease of installation and removal of the seal assembly. The split may comprise means for improving sealing performance, for example a scarf joint or a lap joint.

The seal member may comprise a lower surface which faces towards the bush and the component. The lower surface of the seal member may engage the layer of sealant.

The seal member may comprise an inner portion which overlaps with the flange of the bush, and an outer portion which overlaps with the surface of the component.

The sealant layer may extend between the inner portion of the seal member and the flange, and between the outer portion of the seal member and the surface of the component.

The component may comprise a recess in the surface surrounding the bore, which accommodates the flange of the bush. There may be a gap between an outer edge of the flange and an outer edge of the recess. The recess may have a larger diameter than the flange. The seal member may include a step corresponding to an edge of the recess. Alternatively the flange may sit on a nominal outer surface of the component.

The seal member may include at least one groove formed in the lower surface of the seal member. The groove(s) may be substantially annular. The groove(s) may be filled with the sealant. A groove or plurality of grooves may be provided on the inner portion and/or the outer portion of the seal member. If the flange sits within a recess in the surface of the component surrounding the bore, a groove or a plurality of grooves formed in the outer portion of the seal member may be provided above the recess and/or beyond the outer edge of the recess.

The layer of sealant may comprise at least one O-ring like portion which engages and at least substantially fills a groove formed in the lower surface of the seal member. The O-ring like portions may improve the sealing of the bush assembly and may provide additional protection against the ingress of contaminants, for example if the layer of sealant has a tendency to lift away from the component. The O-ring like portions may also improve the ability of the layer of sealant to securely locate and retain the seal member and may act as an arrestor in the event of a crack or partial failure of the layer of sealant.

The seal member may include a non-porous material.

The seal member may include a plastics material, for example a polyurethane material, or similar. Alternatively the seal member may include an elastomeric material, for example a fluorinated silicone material or another rubber material.

The seal member may be sufficiently flexible to accommodate deformation of the bush and/or displacement of the bush relative to the component under load, for example load applied to the bush by a pintle pin. Deformation may include the bush assuming an elliptical shape. Displacement may include movement of the bush in an axial direction within the bore and/or rotation of the bush within the bore. The seal assembly may, for example, be able to tolerate the bush moving axially by up to 1 mm out of the bore.

In some embodiments, the seal member may comprise reinforcement. The reinforcement may be provided at or near an upper surface of the seal member facing away from the bush and the component. The reinforcement may be embedded within a main body of the seal member below the upper surface of the seal member. The reinforcement may comprise one or more fabric layers, for example a polyester fabric layer. The reinforcement may increase the durability of the seal and protect the seal member from damage during installation of the seal assembly and/or use of the bush assembly.

In some embodiments, the seal member may comprise a main body formed of a first material and one or more contact elements formed of a second material which is different to the first material. The contact element(s) may be provided on the lower surface of the seal member at the interface between the seal member and the layer of sealant. The contact elements may comprise a material which provides a more secure bonding surface for the layer of sealant to adhere to than the first material, thereby increasing the strength and durability of the bond between the seal member and the layer of sealant and increasing the life of the seal assembly. The contact elements may, for example, comprise a GFRP or CFRP layer. The contact elements may be co-cured or bonded to the main body of the seal member.

The flange may have a taper of reducing thickness in the radially outward direction. The seal member may have a complimentary taper.

The layer of sealant may extend beyond an outer edge of the seal member.

The layer of sealant may comprise a single continuous layer which extends substantially under the entire seal member. Alternatively there may be a discontinuity in the layer of sealant. For example, the layer of sealant may comprise a first portion of sealant material between the inner portion of the seal member and the flange of the bush and a second portion of sealant material between the outer portion of the seal member and the component. The first and second portions of sealant material may each be substantially annular. There may be a gap between the first and second portions of sealant material. The gap may comprise a void. The void may extend substantially around a radial outer edge of the flange. Alternatively the gap may be filled with another portion of sealant, adhesive or filler. The use of multiple discrete portions of sealant with a gap between the portions may increase the ability of the seal assembly to accommodate deformation and/or displacement of the bush as discussed above. The use of multiple discrete portions of sealant may also help to arrest propagation of a crack in the event of a partial failure of the layer of sealant.

The seal assembly may comprise multiple contact elements associated with different portions of sealant material. For example the seal assembly may comprise a first contact element via which the first portion of sealant material engages the seal member and a second contact element via which the second portion of sealant material engages the seal member.

The seal member may comprise an integral dust seal portion extending from an upper surface of the seal member facing away from the bush and component. The dust seal may be adapted to form a seal against a second component which is attached to the component in which the bush is fitted by a pin passing through the bore. The dust seal portion may comprise a reinforcement element or biasing element which acts to bias the dust seal portion towards the second component. The biasing element may for example comprise a metallic or composite rod or strip.

The component may be an aircraft landing gear component. For example, the component may be a main landing gear component such as a main landing gear forging or a landing gear rib. Alternatively, the component may be any component in an aircraft, or other vehicle, or in any other application.

The method may further comprise the step of: fitting the bush in the bore before arranging the seal member on the bush. The method may be used to seal a bush which is already fitted in a bore, or may be used to seal a bush which is being newly fitted, or re-fitted, in a bore.

The method may further comprise the step of: removing an existing bush from the bore before fitting the bush into the bore. The method may, therefore, be used to seal a replacement bush which is replacing a used bush, for example a bush which has become worn or degraded.

The method may further comprise re-boring the bore before fitting the bush. The original bore may be re-bored to provide a new bore at substantially the same location as the original bore, the new bore having a greater diameter than the original bore. The bush may then be fitted in the new bore.

The seal assembly may be retro-fitted to an existing bush fitted in a bore of an existing component without modification of the bush or the component.

The method may further comprise placing a tool on the seal member and applying pressure to the seal member to compress the seal member and the layer of sealant. By compressing the layer of sealant, the tool may encourage the layer of sealant to conform to the component and the flange and the seal member, thereby improving the contact between the components of the bush assembly and reducing porosity between the contacting surfaces, and ensuring correct location of the seal member over the component and the bush. By compressing the layer of sealant, the seal member may also be encouraged to adhere to the layer of sealant.

The method may further comprise using the tool to maintain pressure on the seal member, thereby compressing the seal member and the layer of sealant, until the layer of sealant is at least partially cured. The seal member may adhere to the layer of sealant when the layer of sealant has cured.

The first part and/or the second part of the tool may comprise a portion or portions which are adapted to engage a surface of a bore in which the bush is fitted and/or an inner surface of the bush, thereby centring the tool within the bore.

The centring feature(s) may be circular cylindrical portions of the first and/or second parts of the tool. Alternatively, the centring features may take any other shape capable of centring the tool with respect to the bush and/or the bore by engaging the bore surface and/or the inner surface of the bush.

The clamping mechanism may pass through the bush. The clamping mechanism may engage the first part of the tool on one side of the component and engage the second part on an opposing side of the component.

The tool may comprise a seal adapted to prevent sealant from leaking outside a boundary defined by the tool.

The recess may be adapted to cooperate with a surface of a seal member forming part of the seal. The seal may be a seal as described in relation to the first aspect of the invention.

The tool may define an extent to which a layer of sealant extends beyond an outside edge of the seal member.

The tool of the fourth aspect may be used in the method of the third aspect.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
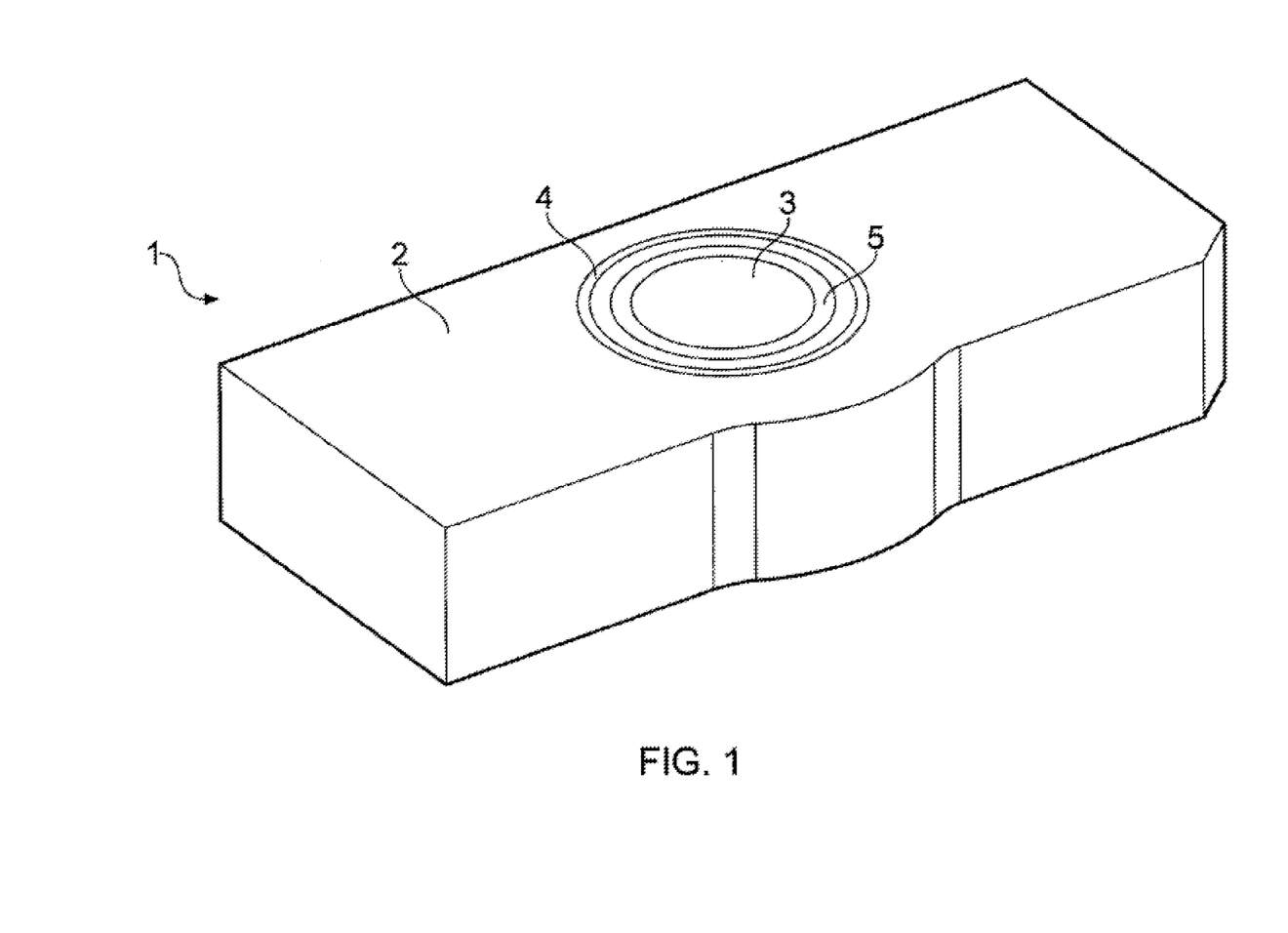
FIG. 1 illustrates a main landing gear component for an aircraft.
Figure 2:
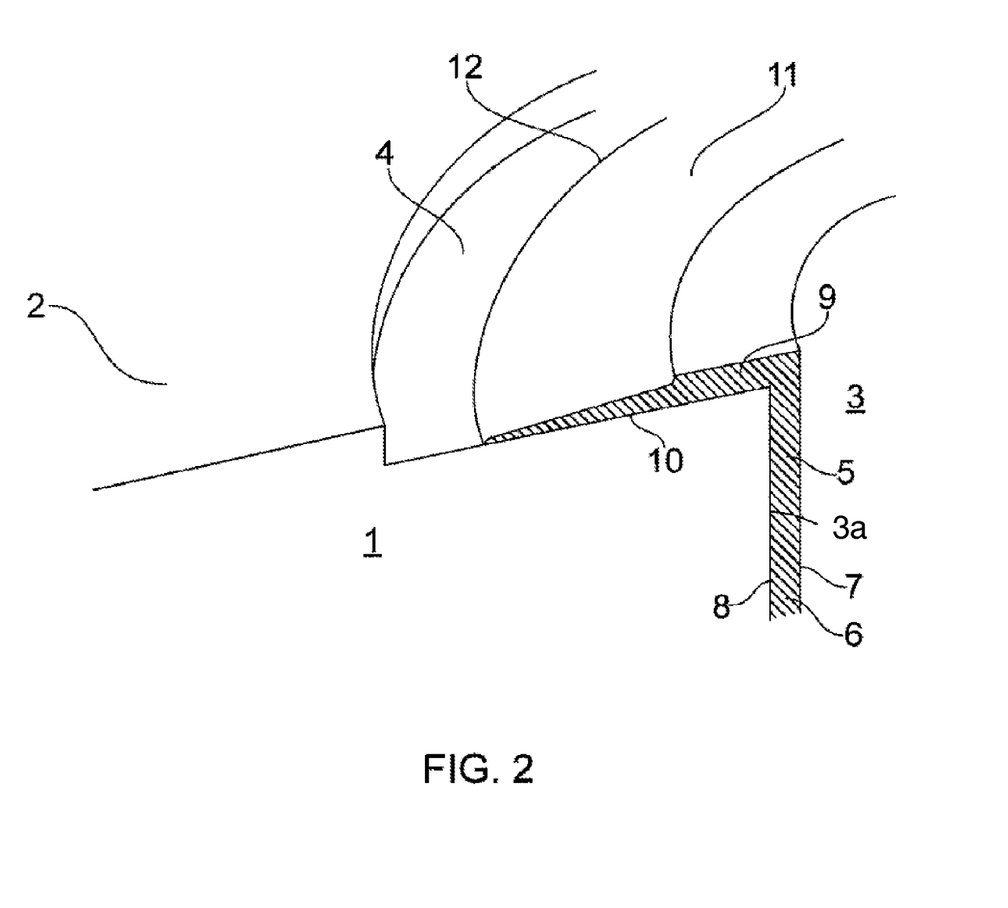
FIG. 2 illustrates a cross section through a main landing gear component with a bush fitted in a bore.

An aircraft (not shown) comprises a landing gear assembly. The landing gear assembly comprises a main landing gear component 1, a portion of which is shown in FIG. 1. The component 1 has an outer surface 2 and a bore 3 extending through the outer surface and continuing through the thickness of the component for receiving a shaft (not shown). The bore 3 has a bore surface 3a, as shown in FIG. 2, and is surrounded by a recess 4 in the outer surface 2. The bore 3 is provided with a bush 5 which is press fitted in the bore 3 and provides an inner surface 7 for rotating engagement with the shaft.

The bush 5 has a tubular body portion 6 and an annular flange portion 9. The body portion 6 is fitted in the bore 3 and provides an inner surface 7 for receiving the shaft and an outer surface 8 which engages the bore surface 3a to hold the bush 5 relative to the component 1. The flange portion 9 has a planar lower surface 10 which sits against component 1 within the recess 4. The flange portion 9 has an outside edge 12 which extends around and faces away from the body portion 6. The flange portion 9 tapers towards its outside edge 12 due to a ramp in its upper surface 11.

Figure 3:
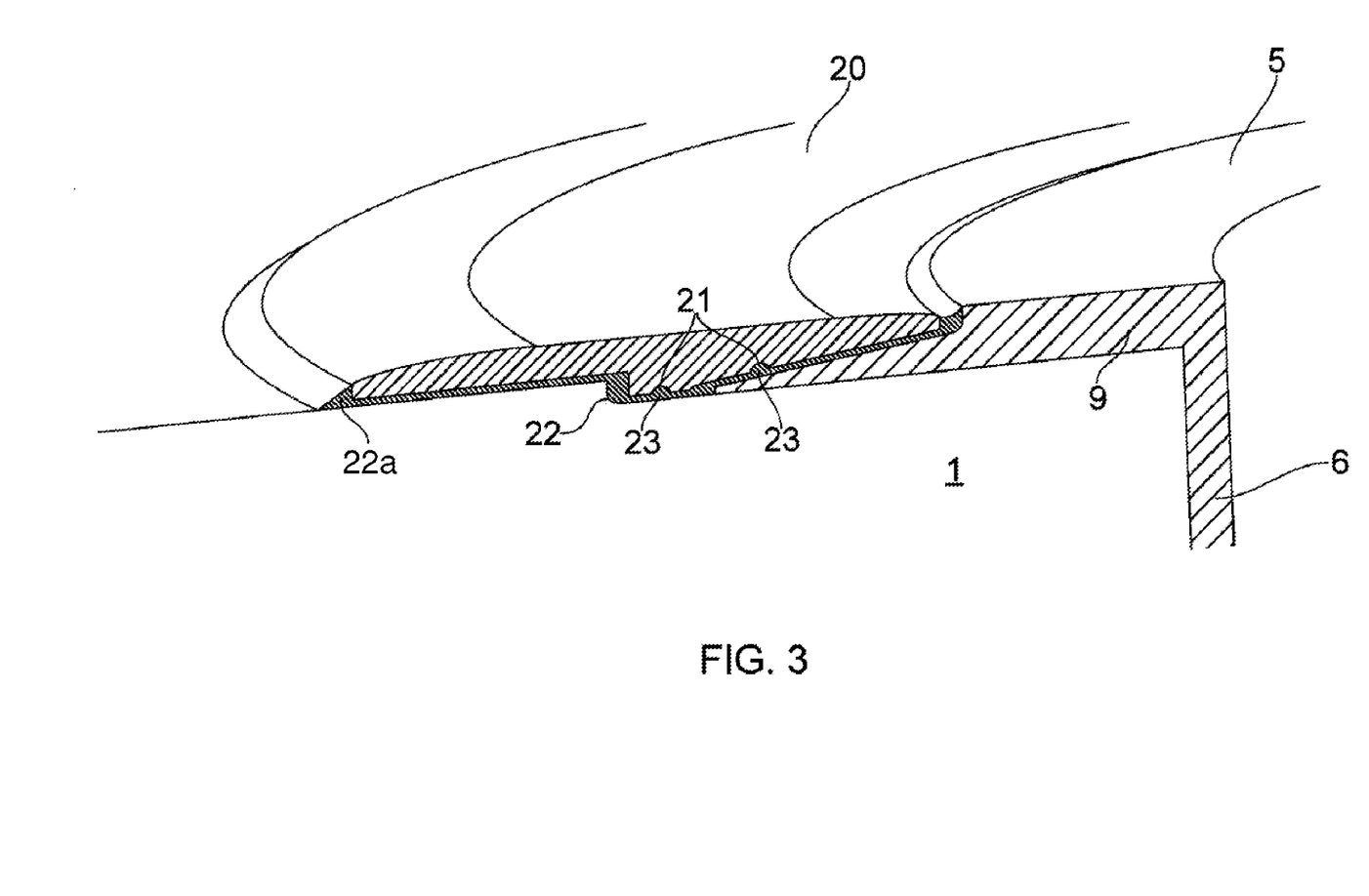
FIG. 3 illustrates a cross section through a bush assembly in accordance with a first embodiment of the invention.
Figure 4:
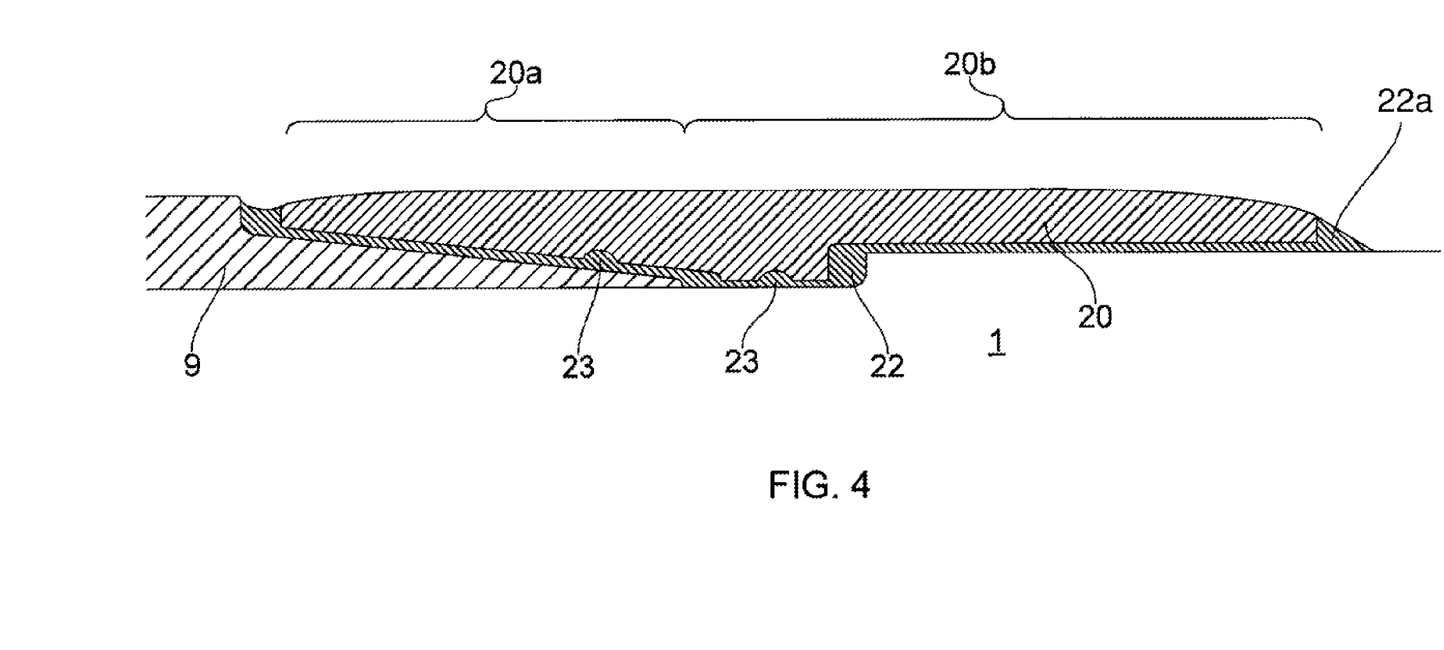
FIG. 4 illustrates a cross section through the seal member used in the bush assembly of FIG. 3.

A seal member 20, arranged as an annular ring, sits over the flange portion 9 of the bush 5 and the outer surface of the component 1 covering the outside edge 12 of the flange portion 9, as shown in FIG. 3. The seal member 20 has an inner portion 20a which sits above the flange portion 9 of the bush 5 and an outer portion 20b which sits above the outer surface of the component 1, as shown in FIG. 4. The seal member 20 has an upper surface which faces away from the component 1 and a lower surface which faces towards the component 1 and the bush 5. The lower surface of the seal member 20 is shaped to correspond to the contours of the flange 9 and the component 1, and has a ramp providing a taper in the thickness of the seal member towards the centre of the bore which corresponds to the taper in the thickness of the flange portion 9 towards its outside edge 12. The lower surface of the seal member 20 also has a step which corresponds to the step provided by the recess 4. The lower surface is provided with grooves 21 in its inner and outer portions 20a, 20b which extend annularly around the seal member 20. The seal member 20 is made from polyurethane and is flexible, resilient and non-porous.

A sealant layer 22 of aerospace grade sealant, for example aerospace epoxy adhesive under ABP 4-5142 (or another sealant or adhesive material as described above), is disposed between the seal member 20 and the flange portion 9 and between the seal member 20 and the component 1, as shown in FIG. 3. The sealant layer substantially fills the volume below the seal member 20, and has a thickness of approximately 0.2 mm between the flange portion 9 and the seal member and between the outer surface 2 of the component 1 and the seal member for optimised adhesion and sealing performance. The sealant layer 22 substantially fills the grooves 21, thereby forming O-ring like protrusions 23 in the sealant layer 22. The sealant layer extends slightly beyond the outer edge of the seal member, forming an outer-most portion 22a of the sealant layer which substantially covers the outer edge of the seal member 20. The seal member 20 substantially covers the sealant layer 22 so that only a small portion of the sealant layer is exposed to the atmosphere.

The seal member 20 and the sealant layer 22 form a seal assembly which seals the interface between the flange portion 9 and the component 1. The sealant layer 22 also seals the gap between the seal member 20 and the external surface of the component 1. The seal assembly reduces the ingress of contaminants including water, oil, dirt and debris between the flange portion 9 and the outer surface of the component 1. The seal assembly, therefore, reduces contamination of the interface between the outer surface 8 of the body portion 6 and the bore surface 3a due to ingress of contaminants under the flange portion 9. In this way, degradation of the bush 5 and the bore surface 3 over time are reduced, and so the life of the bush assembly is increased. The bush 5 is, therefore, less likely to require frequent replacement, and the bore surface 3a of the component 1 is less likely to be degraded to a point at which re-boring of the bore 3 or even replacement of the entire main landing gear component 1 becomes necessary.

The seal member 20 is non-porous and tougher than the sealant layer 22, and substantially covers the sealant layer, thereby protecting it from exposure to moisture, chemicals and mechanical wear. In this way, the seal member 20 reduces the susceptibility of the sealant layer 22 to damage and degradation during use of the bush assembly, so that the effective life of the sealant layer 22 is increased and the seal assembly is less likely to experience a significant reduction in sealing performance over time. The interface between the outer surface 8 of the body portion 6 and the bore surface 3a is, therefore, less likely to become contaminated, and the need for non-destructive tests to assess the performance of the sealant layer is reduced.

The seal member 20 is less permeable than the sealant layer 22 which it covers, so that the seal assembly provides a more effective barrier against contamination than a layer of sealant alone. The seal member 20, therefore, increases the sealing performance of the seal assembly so that the interface between the outer surface 8 of the body portion 6 and the bore surface 3a is less likely to become contaminated. The advantage becomes increasingly significant as the sealant layer 22 ages because the sealant layer tends to become more porous and brittle over time, for example due to age hardening, but the sealant layer remains substantially covered by the non-porous seal member 20 which substantially prevents the exposure of the sealant layer to contaminants.

The O-ring like protrusions 23 formed in the sealant layer 22 improve the sealing of the bush assembly against contaminants and provide additional protection against contaminant ingress if part of the sealant layer 22 should tend to lift away from the component 1. The O-ring like protrusions 23 also assist with secure location of the seal member 20 on the sealant layer 22.

The outer-most portion 22a of the sealant layer 22, which covers the outer edge of the seal member 20, seals the edge of the seal member to prevent the ingress of contaminants under the seal member. The outer-most portion 22a acts to increase the path length for contaminants entering the seal assembly and provides an additional corner between the seal member 20 and the sealant layer, which any contaminants would need to navigate before reaching the interface between the bush 5 and the bore surface 3a.

The recess 4 around the bore 3 and the taper provided in the upper surface 11 of the flange portion 9 of the bush 5 allow the extent of the bush assembly protruding outwards from the outer surface 2 of the component 1 to be minimised (i.e. the seal assembly is only just proud of the outer surface) so that the bush assembly is compact and less susceptible to damage.

Figure 5:
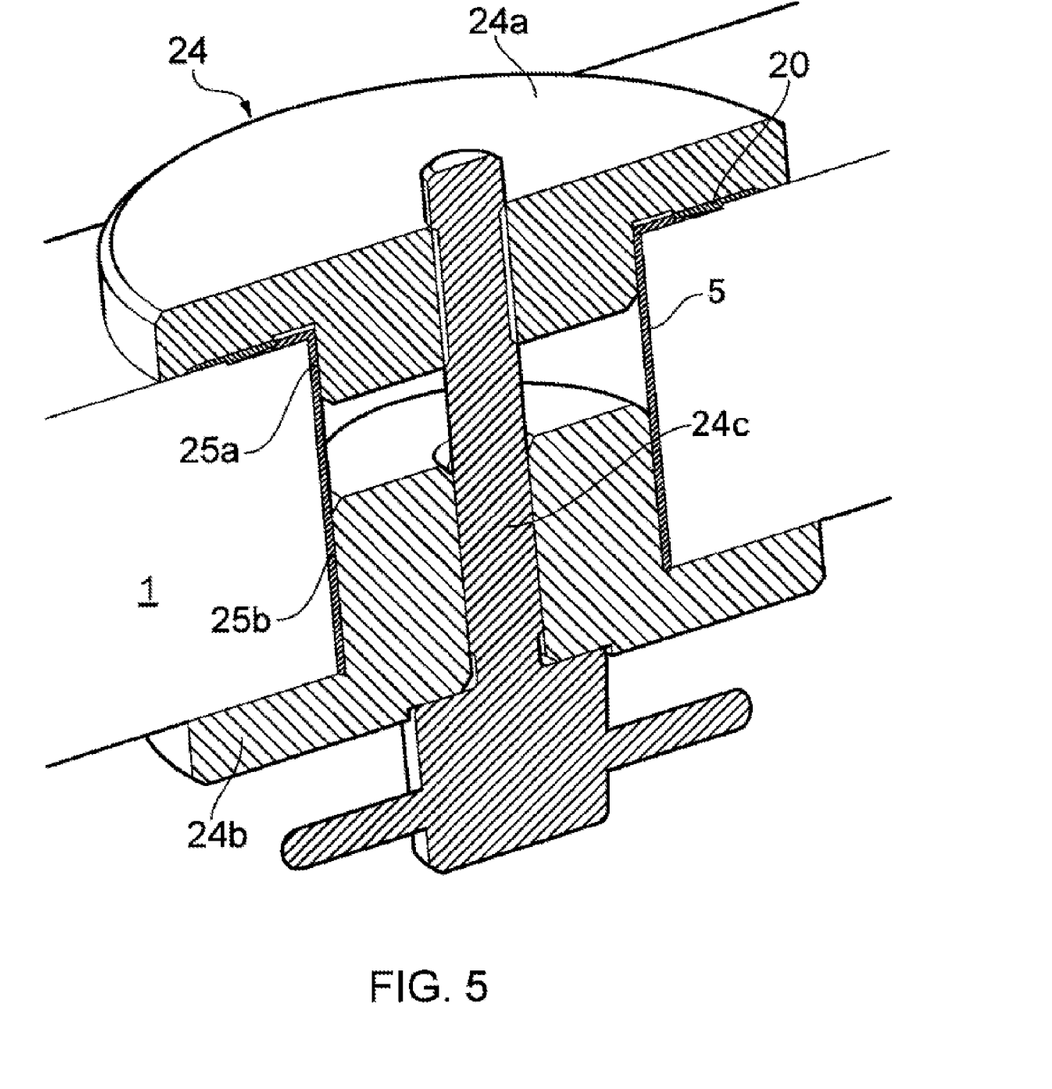
FIG. 5 illustrates a cross section through a tool being used to assemble the bush assembly of FIG. 3.

The bush and seal member are assembled by pressing the bush 5 into the bore 3 in the component 1; applying a layer of aerospace grade sealant over the flange portion 9 of the bush 5 and the component 1 to form the sealant layer 22; placing the seal member 20 over the bush and component 1; and applying pressure to the bush assembly using a clamping tool 24, as shown in FIG. 5.

The tool comprises an upper part (first part) 24a, a lower part (second part) 24b and a stud 24c. The upper part 24a has a working surface which is adapted to engage the seal member 20, while the lower part 24b engages the surface of the component 1 which faces away from the seal assembly. The stud 24c has a threaded end which is received into a threaded recess in the upper part 24a. The stud 24c passes through the bore and engages the upper part 24a on one side of the component (the side on which the seal assembly is provided) and the second part 24b on the opposing side of the component. The stud 24c is rotated to bring the upper and lower parts 24a and 24b together, thereby applying a clamping force to the seal assembly. The upper and lower parts 24a, 24b each have cylindrical surfaces 25a and 25b which engage the inner surface 7 of the body portion 6 of the bush 5 and act as centring means to ensure that the axis of the tool is concentric with the bore 3.

Figure 6:
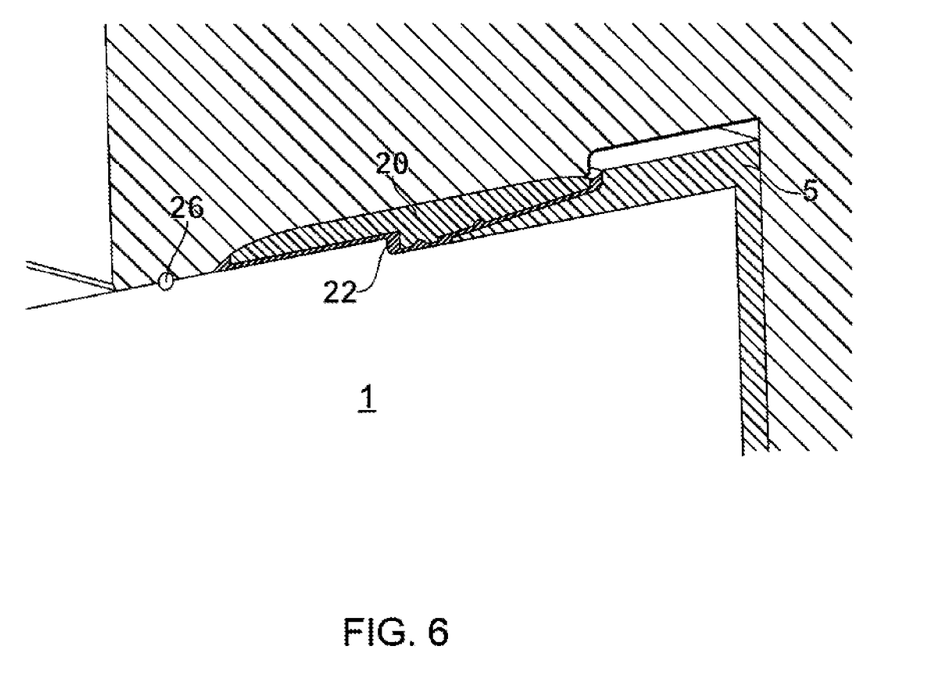
FIG. 6 illustrates an enlarged view of the cross section through the tool of FIG. 5.

The working surface extends beyond the outer edge of the seal member 20 to define the extent to which the sealant layer 22 extends beyond the outside edge of the seal member, as shown in FIG. 6. The tool 24 also comprises a rubber O-ring type seal 26, as shown in FIG. 6, which prevents the sealant layer 22 from leaking outside the tool even when the sealant layer is compressed.

The tool 24 applies a light clamping force to the seal member 20 which compresses the sealant layer 22. By compressing the sealant layer 22 beneath the seal member 20, the sealant layer is encouraged to conform to the surfaces of the component 1, the flange portion 9 of the bush 5 and the seal member 20, thereby improving the contact between the components of the seal assembly and reducing porosity between the contacting surfaces. The tool 24 also helps to ensure correct location of the seal member 20 over the component 1 and the bush 5, and to ensure that the seal member 20 adheres to the sealant layer 22. The tool 24 is used to maintain pressure on the seal assembly for at least 4 hours until the sealant layer 22 is at least partially cured. The rate at which the sealant cures is dependent on the sealant material used and the conditions in which the sealant layer 22 is allowed to cure. The appropriate time period for which the seal assembly is clamped by the tool 24 therefore depends on the choice of sealant and the curing conditions.

In an alternative embodiment, the seal member 20 and sealant layer 22 are applied to a used bush 5 which is already installed in a main landing gear component 1 of an in service aircraft. The seal assembly may, therefore, be applied to an aircraft having a used bush. Alternatively, when the seal assembly is installed on an in service aircraft, a used bush may be removed from the bore 3 before the replacement bush 5 is fitted in the bore. If the bore surface 3a of the main landing gear component 1 has become degraded, for example due to contamination of the interface between the bore surface 3a and the outer surface 8 of the body portion 6 of the bush 5, a boring tool is used to re-bore the bore 3 to provide a new bore surface into which the bush is fitted. The new bore is at the same location as the original bore and has a greater diameter. The replacement bush 5 therefore has a greater diameter than the used bush which is replaced.

Figure 7:
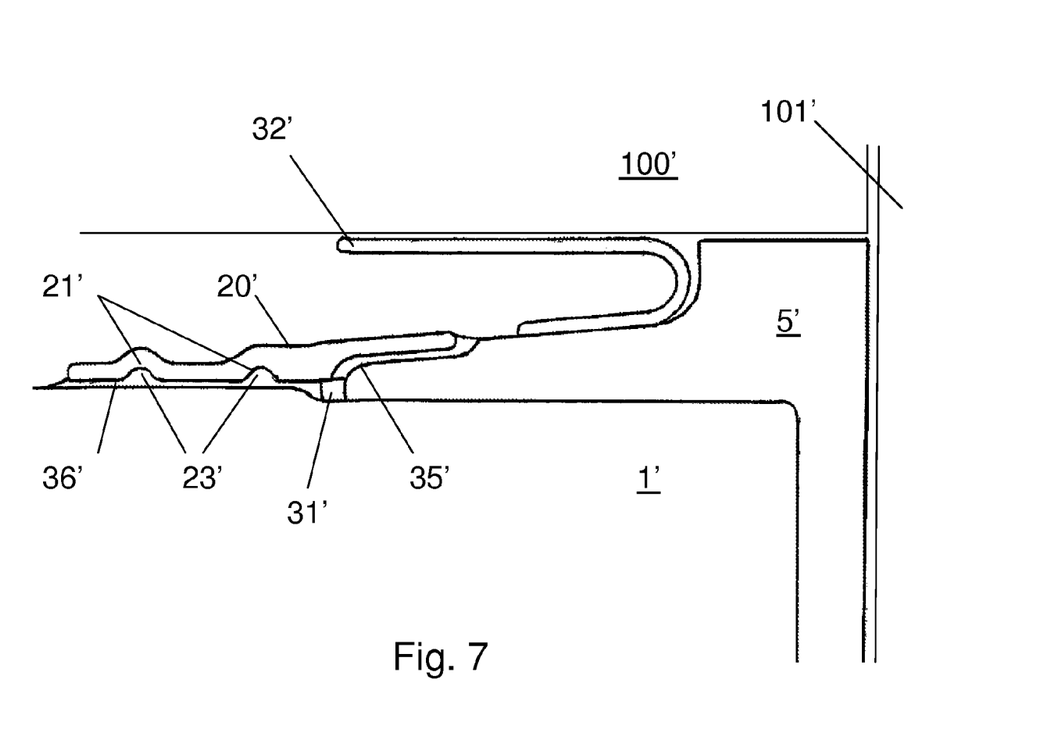
FIG. 7 illustrates a cross section through a bush assembly in accordance with a second embodiment of the invention.

FIG. 7 illustrates a cross section through a bush assembly in accordance with a second embodiment of the invention. The bush assembly of FIG. 7 is a modified version of that shown in FIGS. 3 and 4 and the same reference numbers followed by a prime (') have been used for identical or equivalent components. The sealant layer comprises a first portion 35' of aerospace epoxy adhesive (or another sealant or adhesive material as described above) between the inner portion of the seal member and the flange of the bush 5' and a second portion 36' of aerospace epoxy adhesive (or another sealant or adhesive material as described above) between the outer portion of the seal member and the component 1'. There is a gap 31' between the first and second portions of sealant material. The seal member comprises two grooves 21' in its lower surface. Both grooves are formed in the outer portion of the seal member such that two O-ring like protrusions 23' are formed in the second portion of epoxy adhesive 36' between the seal member and the component 1'. The bush assembly further comprises a dust shield 32' attached to the flange of the bush 5' which seals against a second component 100' connected by a pin 101' to prevent the ingress of dust and other debris between the first and second components.

Figure 8:
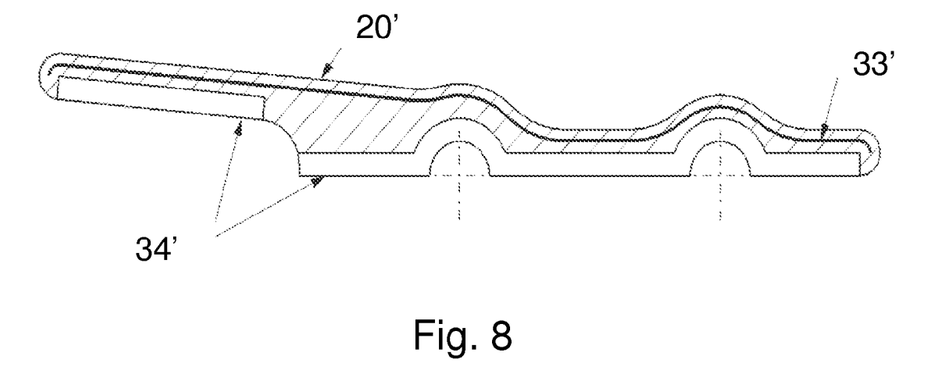
FIG. 8 illustrates a cross section through the seal member used in the bush assembly of FIG. 7.

FIG. 8 illustrates a cross section through the seal member 20' of FIG. 7. The seal member is formed of a fluorinated silicone and comprises a reinforcement layer 33' of polyester fabric. The seal member 20' further comprises an annular inner contact element 34' at the interface between the inner portion of the seal member and the first portion 35' of the sealant layer and an annular outer contact element 34' at the interface between the outer portion of the seal member and the second portion 36' of the sealant layer. The contact elements 34' comprise a glass fibre fabric pre-preg which is co-cured with the main body of the seal member 20'. The contact elements 34' increase the strength of the bond between the seal member 20' and the sealant layer.

Figure 9:
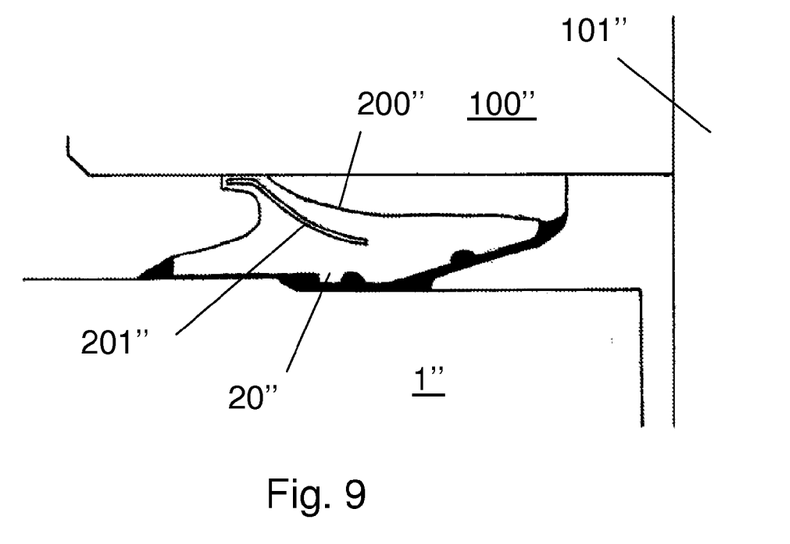
FIG. 9 illustrates a cross section through a bush assembly in accordance with a third embodiment of the invention.

FIG. 9 illustrates a cross section through a bush assembly in accordance with a third embodiment of the invention. The same reference numbers followed by a double prime (") have been used for identical or equivalent components. In the bush assembly of FIG. 9 a seal member 20" includes an integral dust seal portion 200" extending outwardly from the upper surface of the seal member and forming a seal against the second component 100". The dust seal portion 200" includes an integral biasing element 201" which acts to bias the dust seal portion towards the second component.

In an alternative embodiment, the seal member may comprise any known non-porous material.

In an alternative embodiment, the bush may have a split down one side or may be provided in multiple segments.

In an alternative embodiment, the seal member may comprise any number of grooves which form O-ring like protrusions in the sealant layer, or no grooves.

In an alternative embodiment, the outside edge 12 of the flange portion 9 may extend up to the outside diameter of the recess 4.

In an alternative embodiment, the component 1 may not comprise a recess surrounding the bore 3, so that the lower surface 10 of the flange portion 9 sits on the outer surface of the component.

In an alternative embodiment, the sealant layer may be applied to the lower surface of the seal member before the seal member is arranged on the main landing gear component.

In an alternative embodiment, the bush assembly may be used in any aircraft or non aircraft application in which a bore in a component is provided with a bush.

Although the invention has been described above with reference to one or more preferred embodiments, it will be appreciated that various changes or modifications may be made without departing from the scope of the invention as defined in the appended claims. In particular, one or all of the features of any one of the embodiments may be combined with any of the features of any other embodiment or with a bush assembly or method according to the appended claims.

The invention claimed is:

1. A bush assembly comprising a component having a bore, a bush fitted in the bore and having a flange that extends radially outwardly over a surface of the component surrounding the bore, and a seal assembly for forming a sealing arrangement between the flange and the surface of the component, wherein the seal assembly includes a seal member, and a layer of sealant between a first interface formed between the seal member and the flange, and a second interface formed between the seal member and the surface of the component.

2. A bush assembly according to claim 1, wherein the sealant layer seals a first gap between the seal member and the component and thereby substantially prevent the ingress of contaminants into the interface between the flange and the surface of the component.

3. A bush assembly according to claim 1, wherein the seal member is substantially annular.

4. A bush assembly according to claim 1, wherein the seal member includes an inner portion which overlaps with the flange of the bush, and an outer portion which overlaps with the surface of the component.

5. A bush assembly according to claim 4, wherein the sealant layer extends between the inner portion of the seal member and the flange, and between the outer portion of the seal member and the surface of the component.

6. A bush assembly according to claim 5, wherein the layer of sealant comprises a first portion of sealant material between the inner portion of the seal member and the flange of the bush and a second portion of sealant material between the outer portion of the seal member and the component, and wherein there is a second gap between the first and second portions of sealant material.

7. A bush assembly according to claim 6, wherein the gap comprises a void extending substantially around a radial outer edge of the flange.

8. A bush assembly according to claim 1, wherein the seal member includes at least one groove formed in a lower surface of the seal member, which is filled with the sealant.

9. A bush assembly according to claim 1, wherein the seal member includes a plastics material or an elastomeric material.

10. A bush assembly according to claim 1, wherein the seal member comprises a main body formed of a first material and one or more contact elements formed of a second material which is different to the first material, each contact element being provided at a third interface between the seal member and the layer of sealant.

11. A bush assembly according to claim 1, wherein the layer of sealant extends beyond an outer edge of the seal member.

12. A bush assembly according to claim 1, wherein the component is an aircraft landing gear component.

13. A bush assembly according to claim 12, wherein the aircraft landing gear component is a main landing gear forging or landing gear rib.

14. A kit of parts for forming a bush assembly, the kit of parts comprising a bush for fitting in a bore in a component, a seal member and a sealant material; wherein the bush has a flange that is adapted to extend radially outwardly over a surface of the component surrounding the bore when the bush is fitted in the bore; and wherein the sealant material is for providing a layer of sealant between the seal member, the flange and the surface of the component such that the layer of sealant seals a first interface between the flange and a second interface between the seal member and a surface of the component.

15. A method for sealing a bush, the method comprising the steps of: providing a component having a bore with a bush fitted in the bore, the bush having a flange that extends radially outwardly over a surface of the component surrounding the bore; arranging a seal member with respect to the bush; and introducing a sealant material so as to provide a layer of the sealant material at a first interface between the seal member and the flange and a second interface between the seal member and the surface of the component.

* * * * *